United States Patent [19]
Loehle

[11] 3,738,720
[45] June 12, 1973

[54] BEARING LOCKING MEANS
[75] Inventor: Max Joseph Loehle, Lynn, Mass.
[73] Assignee: General Electric Company, Lynn, Mass.
[22] Filed: Aug. 24, 1971
[21] Appl. No.: 174,410

[52] U.S. Cl. .............................................. 308/236
[51] Int. Cl. ............................................ F16c 33/30
[58] Field of Search................... 308/236; 287/52.09

[56] References Cited
UNITED STATES PATENTS
| 425,569 | 4/1890 | Gare | 308/240 |
|---|---|---|---|
| 1,200,060 | 10/1916 | Wemp | 308/240 |
| 2,497,550 | 2/1950 | Jeffries | 287/52.09 |

Primary Examiner—Charles J. Myhre
Assistant Examiner—Frank Susko
Attorney—Edward S. Roman and Derek P. Lawrence

[57] ABSTRACT

A bearing locking means is provided to accommodate insertion of a bearing assembly within a mounting member in cases where a spring clutch type coil cannot be unwound by rotating the outer ring of the bearing assembly. Insertion of the bearing assembly within the coil is accommodated by diametrically expanding the coil prior to bearing insertion and by flaring the sides of each convolution of the coil so that a portion of the axial force of bearing insertion is directed radially outward to further diametrically expand the coil.

11 Claims, 10 Drawing Figures

PATENTED JUN 12 1973

INVENTOR.
MAX J. LOEHLE
BY
ATTORNEY

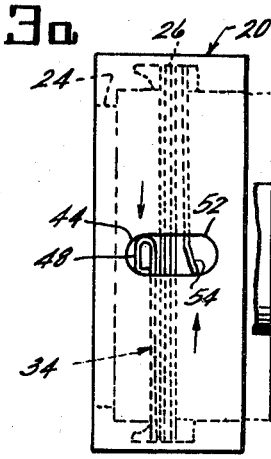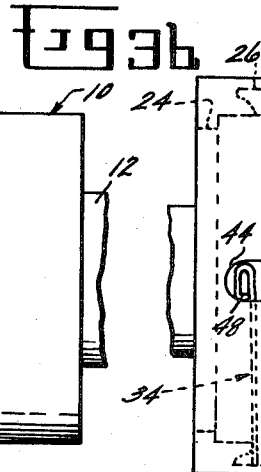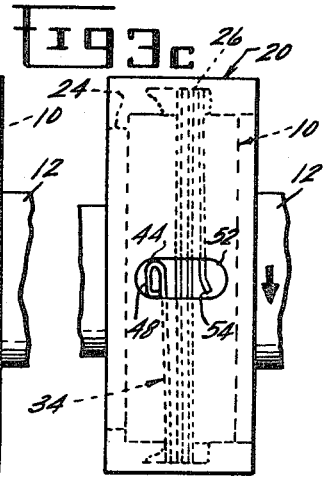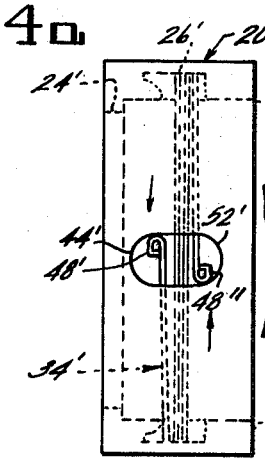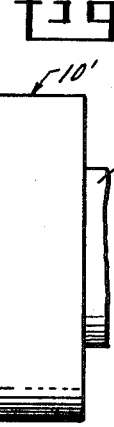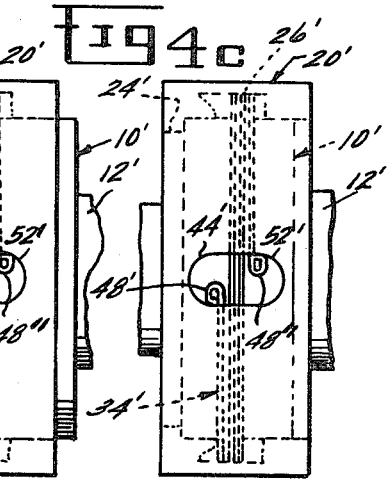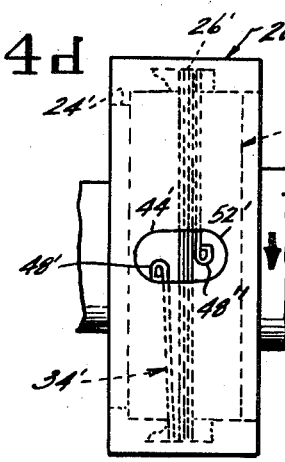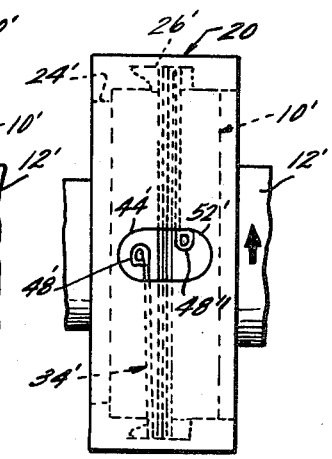

3,738,720

BEARING LOCKING MEANS

BACKGROUND OF THE INVENTION

In general, this invention relates to a bearing locking means for maintaining a bearing assembly within a mounting member and more particularly to a bearing locking means for restraining circumferential slippage between a bearing outer ring and the wall of a mounting body within which the outer ring of the bearing is maintained.

Generally, the outer ring of a bearing assembly is inserted within a bore through a mounting wall. Unless the outer bearing ring is restrained from rotation within the bore, rotation of the bearing shaft tends to also cause rotation of the outer bearing ring within the bore resulting in excessive frictional wear.

One previously suggested means for preventing rotation of an outer bearing assembly ring relative to a mounting member includes extending a helically wound wire coil around the bearing ring and anchoring one end to the mounting member so that any tendency of the bearing ring to rotate relative to its mounting member causes the spring to tightly wrap around the bearing ring preventing such rotation. In order to insure tight gripping action between the coil and bearing ring, it is necessary to form the inside diameter of the coil smaller than the bearing ring outside diameter. Insertion of the bearing ring within the coil is accomplished by turning the ring in a direction tending to unwind and expand the coil.

Bearing assemblies are often pre-assembled on a shaft or gear for insertion within the mounting member. Often it is required that the bearing assembly be inserted by the shaft alone without access to the outer bearing ring. In such situations, however, it becomes impossible to turn the outer bearing ring in the direction required to unwind and expand the coil. Forming the diameter of the coil to conform to the diameter of the bearing outer ring results in a corresponding loss of gripping action and does not provide an acceptable solution.

Therefore, it is an object of this invention to provide a means for inserting a bearing outer ring within a coil of smaller diameter than the outer ring without having to turn the outer ring in the direction required to unwind and expand the coil.

It is a further object of this invention to provide a means by which a coil may be retained within the mounting member in a diametrically expanded condition to enable insertion of a bearing outer ring therein without sacrificing the gripping action of the coil.

SUMMARY OF THE INVENTION

Briefly stated, the invention is a fastening device for limiting circumferential slippage between a rotatable member and a mounting member wherein the rotatable member is disposed within a bore in the mounting member. The fastening device comprises a circularly wound wire coil having an inner diameter of smaller dimension than the outer diameter of the rotatable member. The circularly wound wire coil is diametrically expanded within the mounting bore by installation of each end of the coil within respective openings in the surface of the bore so as to accommodate insertion of the rotatable member within the coil. Subsequent rotation of the rotatable member within the bore results in a tight wrapping of the coil therearound, and restrains further circumferential slippage between the rotatable and mounting members. The bore of the mounting member preferably includes an annular groove in the surface thereof for receiving the circularly wound coil. The wire of the coil is also preferably rectilinear in cross-section with the radially extending sides of each convolution axially inclined in the direction of insertion of the rotatable member within the bore. The inclined sides of each convolution of the coil, upon initial insertion of the rotatable member within the bore and engagement of the rotatable member with the coil, act to direct a portion of the axial force radially outward to further diametrically expand the coil into the annular groove, permitting insertion of the rotatable body into the coil.

BRIEF DESCRIPTION OF THE DRAWINGS

While the specification concludes with claims particularly pointing out and distinctly claiming the invention, it is more readily understandable by reference to the text below and the accompanying drawings in which:

FIGS. 3 a, b, and c are a series of side views showing in sequence the various stages of assembly and operation of the bearing locking means of FIG. 1.

FIGS. 4 a, b, c, d, and e are a series of side views showing in sequence the various stages of assembly and operation of an alternate bearing locking means.

DESCRIPTION OF THE PREFERRED EMBODIMENT

Figure 1:
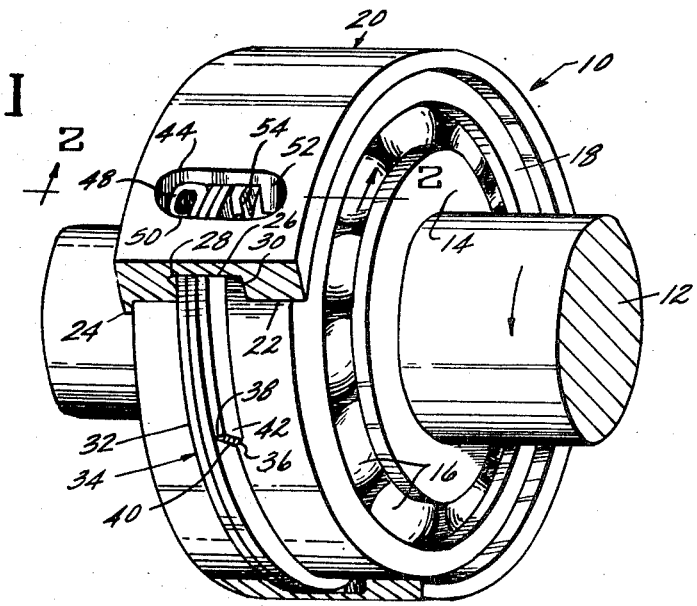
FIG. 1 is a fragmented perspective view of a bearing assembly retained within a mounting member by the bearing locking means of this invention.
Figure 2:
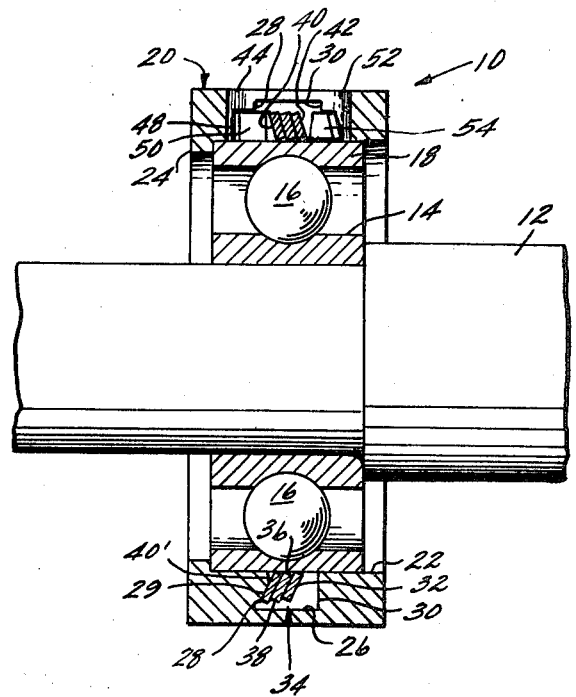
FIG. 2 is a cross-sectional view taken along the line 2—2 of FIG. 1.

Referring to FIGS. 1 and 2, there is shown a bearing assembly 10 incorporating the bearing locking means of this invention. A broken away portion of a rotatable shaft 12 is shown as including an inside annular ring 14. The annular ring 14 circumscribes the shaft 12 and may be retained in fixed position relative to the shaft for rotation therewith by means of a press fit to the shaft. Alternatively, the inside ring could be secured to the shaft by means of a bearing retaining nut (not shown) in a manner well known to the art. A plurality of balls 16 are circumferentially disposed about the inner bearing ring 14 and radially retained relative to the inner bearing ring by means of an outer annular bearing ring 18. The outer bearing ring 18 is radially spaced apart from the inner bearing ring 14 and is maintained in concentric relation to the inner bearing ring 14 by the balls 16.

The shaft 12 is journalled for rotation with respect to the wall of a housing, a portion of which is shown generally at 20. The wall of the housing includes a bore 22 therethrough, the interior surface of which is generally cylindrical for loosely receiving the outer annular bearing ring 18. The interior surface of the bore 22 may include an inwardly directed flange 24 to axially locate the outer bearing ring 18 within the bore. Although the interior surface of the bore 22 is described as generally cylindrical, it may assume other geometric configurations and is limited only in respect that concentricity of the bore to the center axis of the outer annular ring must be maintained.

The interior surface of the bore 22 includes an annular groove 26 having two sidewalls 28, 30 which may extend in substantially radial directions. Sidewall 28 preferably includes an axially extending circumferential abutment 29, the purpose of which will be subsequently made obvious from the following discussion.

Within the annular groove 26 there is included a bearing anti-spin device shown generally as a resilient wire 32 wound in the form of a circular coil 34 with adjacent convolutions in actual or near contact. The resilient wire 32 is preferably rectilinear in cross-section. Each convolution of the circularly wound wire 32 defines an axially inclined annular inside surface 36 and an axially inclined annular outside surface 38. The radially extending sidewalls 40, 42 of the circularly wound wire 34 are also axially inclined so that each convolution of the coil substantially defines a frustoconical annulus having sidewalls 40, 42.

Means for circumferentially locking one end of the circularly wound coil 34 within the groove 26 is provided in the form of an opening 44 axially extending from the sidewall 28 of the groove. The end of the circularly wound wire to be circumferentially retained with respect to the groove is provided with a tab 48 for engagement within the opening 44. Although the tab 48 may simply be characterized by a bend in the end of the circularly wound wire, it is preferred that the end of the coil be lapped over, with the lapped end terminating in a bend 50 axially directed back toward the coil. The tab may alternatively include a separate piece welded on to the end of the coil. As can be readily seen from the drawings, engagement of the tab 48 within the opening 44 prohibits significant circumferential movement of that end of the circularly wound spring in either direction. Further, it is to be understood that radially extending openings and tabs could alternatively be utilized to provide circumferential locking engagement for one end of the coil.

The other end of the coil is circumferentially restrained from movement in only one direction by means of a second opening 52 axially extending from the opposing sidewall 30 of the groove so as to connect with opening 44. The other end of the circularly wound wire is axially bent at 54 so that the tip extends within the opening 52 and engages one wall of the opening. Although the openings 44 and 52 are shown as axially connected by means of groove 26 and in axially opposing relation, it is not necessary that they be so located. All that is required is that the engaging wall of the opening 52 be circumferentially disposed with respect to the engaging walls of opening 44 so as to effect a diametral expansion of the coil when both ends of the wound wire are inserted within their respective openings. It may be readily observed from the drawings that the bend 54 is free to move in the circumferential direction that would effect further diametral expansion of the coil, but is prohibited by abutting engagement with the sidewall of the opening 52 from moving in the circumferential direction that would effect diametral contraction of the coil. Again, it should be appreciated that although the preferred bend and opening have been described as extending in axial directions, it is equally obvious that they could be arranged to extend in radial directions.

Upon shaft rotation, there is a tendency for the outer annular bearing ring to rotate, particularly where the outer ring is loosely fitted within the cylindrical bore 22. Circumferential slippage between the outer ring and the wall of the housing results in excessive wear causing the bearing to loosen within the housing and introducing particulate matter into the area of the bearing. The circularly wound wire coil 34 restricts circumferential slippage between the housing wall and outer ring by tightly wrapping around the outer ring so as to form a spring clutch in a manner well known to the art. The gripping torque of the circular spring around the outer ring is directly proportional to the interference between the inside diameter of the coil and the outside diameter of the bearing assembly. If the inside diameter for the coil can be made substantially smaller than the outside diameter of the outer ring, gripping torque will be substantially increased. Decreasing the inside diameter of the coil, however, as previously discussed, becomes impractical in situations where a completed bearing assembly must be blindly inserted within a housing bore without access to the outer ring so as to turn the outer ring in the direction required to unwind and diametrically expand the coil.

The circumferential arrangement of the openings 44, 52 relative to each other, in combination with the axially extending circumferential abutment 29 of the annular groove, facilitate blind insertion of the completed bearing assembly within the housing bore in the following manner, Limited diametral interference between the coil and outer ring can be tolerated during insertion of the bearing within the housing bore. If the diametral interference becomes excessive, however, the outer ring cannot be inserted within the housing bore, again assuming the outer ring to be inaccessible for rotation to effect an unwinding of the coil. The coil of this invention is initially wound to conform to such a small diameter, when compared to the diameter of the bearing, that insertion of the outer bearing ring therein would be prohibited. However, the openings 44, 52 are circumferentially arranged relative to each other so as to cause the coil to diametrically expand when installed within the openings permitting insertion of the bearing assembly within the housing bore with only limited diametral interference between the coil and outside ring.

The frusto-conical sidewalls 40, 42 of the coil are axially flared in the direction of insertion of the bearing assembly within the housing bore, with the sidewall of the end convolution shown at 40' in FIG. 2 slidably engaging the edge of the circumferential abutment 29. Further diametral expansion of the coil upon initial engagement of the coil by the outer ring is required to overcome the limited diametral interference therebetween, even in view of the fact that the coil has already been diametrically expanded by installation within the openings 44, 52. The axial force of bearing insertion upon engaging the coil operates to slide each consecutive convolution of the coil axially and radially outward over the adjacent convolution to further diametrically expand the coil for complete bearing insertion. As may be readily observed from the drawings, an axial force directed against the last convolution operates to slide the sidewall 40' over the edge of abutment 29 in an axial and radially outward direction. Abutment 29 engages the last convolution in a manner which maintains the axial flare coil sidewalls during bearing insertion. In alternative embodiments the abutment 29 could be entirely eliminated, although if eliminated, it is preferred that the sidewall 28 also be axially flared in the direction of bearing insertion so as to facilitate diametral expansion of the coil upon engagement by the outer ring.

The required procedure for bearing insertion within a housing bore may be better understood by referring to FIGS. 3a, b, and c. FIG. 3a shows a coil 34 inserted within the annular groove 26 of the bore of a housing. The coil has been diametrically expanded by engagement of the tab 48 within the opening 44 and by the bend 54 within the opening 52. The sidewalls of the openings 44, 52 exert circumferential force against the ends of the coil in the direction shown by the arrows so as to maintain the coil in its diametrically expanded condition. FIG. 3b shows the bearing housing 20 after insertion of the bearing assembly 10 therein. It can be seen that the further diametral expansion of the coil caused by insertion of the bearing results in the bend 54 circumferentially shifting in the clockwise direction away from the sidewall of the opening 52. Clockwise and counter-clockwise rotation is referenced from the side of bearing insertion. The other end of the coil does not move significantly due to the restraint of tab 48 from circumferential movement in either direction. FIG. 3c shows the coil 34 tightly wrapped around the bearing 10 when the outer ring is rotated in the counter-clockwise direction preventing the bearing from turning due to the spring-clutch action of the coil. Upon counter-clockwise rotation, it can be seen that the bend 54 also moves slightly in the counter-clockwise direction toward the sidewall of opening 52. The dimensional limits are predetermined so that upon shaft rotation the bend 54 will not move so far as to engage the sidewall of the opening 52.

Referring now to FIGS. 4 a, b, c, d and e, there is shown a scheme by which a single coil may be formed to restrain outer ring rotation in either circumferential direction. A coil 34' is inserted in an annular groove 26' in the bore of a housing 20'. The ends of the coil are formed in tabs 48', 48" for engagement within the openings 44', 52' respectively. As can be seen from the drawing, the openings have been made sufficiently wide to permit limited circumferential movement of the tabs therein. FIG. a shows the coil 34' inserted within the groove 26' and diametrically expanded by engagement of the tabs 48', 48" within the openings 44', 52' respectively. FIG. b shows the bearing 10 partially inserted within the bore of the housing wherein the partial insertion of the bearing has caused a further diametral expansion of the coil, forcing the tab 48" to translate in a clockwise direction into engagement with the opposing sidewall of the opening 52'. Continued insertion of the bearing within the housing bore results in continued diametral expansion of the coil convolutions, with the tab 48' translating in the counter-clockwise direction as shown in FIG. 4c. Counter-clockwise rotation of the bearing outer ring, as shown in FIG. 4 d, tends to wind the coil in the counter-clockwise direction with the tab 48" moving away from the sidewall of opening 52" but not engaging the opposing sidewall of the opening. Tab 48' is restrained from circumferential counter-clockwise movement by engagement with the sidewall of slot 44', as shown. Clockwise rotation of the bearing outer ring, as shown in FIG. 4 e, tends to wind the coil in the clockwise direction with the tab 48' moving away from the sidewall of opening 44' but not engaging the opposing sidewall of the opening. Tab 48" is restrained from circumferential clockwise movement by engagement with the sidewall of opening 52', as shown. Thus, it can be seen that a single coil eliminates circumferential slippage between the housing bore and outer ring for rotation in either clockwise or counter-clockwise directions.

The number of turns to which the wire 32 is wound may vary depending on the gripping torque desired. Overall gripping torque for the coil is found to increase at a near exponential rate for each additional turn added to the coil. It has been found that typical applications require on the order of three to five turns.

Also, although the bearing assembly has been described in relation to ball bearings, it is to be understood that rollers, cones, or any other type of revolving means commonly disposed between two rings may be substituted for the balls without departing from the scope of the invention.

Having described preferred embodiments of the invention, though not exhaustive of all possible equivalents, what is desired to be secured by Letters Patent is distinctly claimed and particularly pointed out in the claims appearing below.

What is claimed is:

1. A fastening device for limiting circumferential slippage comprises:
   a rotatable member,
   a mounting member wherein the rotatable member is disposed within a bore in the mounting member, and
   a circularly wound wire coil having an inner diameter of smaller dimension than the outer diameter of the rotatable member, and being diametrically expanded within the mounting bore to a diameter no greater than the diameter of the rotatable member, by installation of each end of the coil within respective openings in the surface of the bore, accommodating insertion of the rotatable member within the coil so that rotation of the rotatable member within the bore results in a tight wrapping of the coil therearound, restraining further circumferential slippage between the rotatable and mounting members.

2. The fastening device of claim 1 wherein one end of the circularly wound wire includes a tab such that engagement of the tab within an opening substantially restrains further circumferential movement of the tab in either direction and the other end of the circularly wound wire is bent to engage one sidewall of another opening so as to only restrain diametral contraction of the coil.

3. The fastening device of claim 1 wherein:
   the bore includes an annular groove in the surface thereof for receiving the circularly wound coil, and the wire of the coil is of rectilinear cross-section with the radially extending sides of each convolution being axially flared in the direction of insertion of the rotatable member within the bore such that upon initial insertion of the rotatable member within the bore and subsequent engagement of the rotatable member with the coil, the flare of the sides of each convolution act to direct a portion of the axial force radially outward to further diametrically expand the coil into the annular groove permitting insertion of the rotatable body into the coil.

4. The fastening device of claim 3 wherein the rotatable body is the outer ring of a bearing assembly and the mounting body is a wall of a housing within which the bearing is journalled.

5. The fastening device of claim 3 wherein the side of the groove includes an axially extending circumferential abutment the edge of which slidably engages the end convolution of the circularly wound wire such that the axial force of inserting the rotatable member within the bore, when directed against the opposing end convolution of the coil, operates to slide each consecutive convolution over the adjacent convolution in an outward axial and radial direction with the flared side of the end convolution sliding over the edge of the abutment in like direction.

6. A fastening device for limiting circumferential slippage comprises:
   a rotatable member,
   a mounting member wherein the rotatable member is disposed within a bore in the mounting member, and
   a circularly wound wire coil having an inner diameter of smaller dimension than the outer diameter of the rotatable member, and an annular groove in the surface of the bore for receiving the circularly wound coil, wherein the wire of the coil is of rectilinear cross-section with the radially extending sides of each convolution axially flared in the direction of insertion of the rotatable member within the bore such that upon initial insertion of the rotatable member within the bore and subsequent engagement of the rotatable member with the coil, the flare of the sides of each convolution acts to direct a portion of the axial force radially outward to further diametrically expand the coil into the annular groove, permitting insertion of the rotatable body into the coil.

7. The fastening device of claim 6 wherein the side of the groove includes an axially extending circumferential abutment, the edge of which slidably engages the end convolution of the circularly wound wire such that the axial force of inserting the rotatable member within the bore, when directed against the opposing end convolution of the coil, operates to slide each consecutive convolution over the adjacent convolution in an outward axial and radial direction with the flared side of the end convolution sliding over the edge of the abutment in like direction.

8. A fastening device for limiting circumferential slippage comprises:
   a rotatable member,
   a mounting member wherein the rotatable member is disposed within a bore in the mounting member, and
   a circularly wound wire coil having an inner diameter of smaller dimension than the outer diameter of the rotatable member wherein each end of the circularly wound wire includes a tab such that installation of the tabs within respective openings in the surface of the bore allows significant movement of both tabs within circumferentially spaced limits resulting in tight wrapping of the coil around the rotatable member for rotation thereof in either clockwise or counter-clockwise directions.

9. The fastening device of claim 8 wherein the circularly wound wire coil has an inner diameter of smaller dimension than the outer diameter of the rotatable member with the coil being diametrically expanded within the mounting bore to a diameter no greater than the diameter of the rotatable member, by installation of the tab within the respective openings to accommodate insertion of the rotatable member within the coil.

10. The fastening device of claim 8 wherein the bore includes an annular groove in the surface thereof for receiving the circularly wound coil, and the wire of the coil is of rectilinear cross-section with the radially extending sides of each convolution axially flared in the direction of insertion of the rotatable member within the bore, such that upon initial insertion of the rotatable member within the bore and subsequent engagement of the rotatable member with the coil, the flare of the sides of each convolution acts to direct a portion of the axial force radially outward to further diametrically expand the coil into the annular groove permitting insertion of the rotatable body into the coil.

11. A fastening device for limiting circumferential slippage comprises:
   a rotatable member,
   a mounting member, wherein the rotatable member is disposed within a bore in the mounting member and the bore includes an annular groove in the surface thereof, and
   a circularly wound wire coil having an inner diameter of smaller dimension than the outer diameter of the rotatable member and being of rectilinear cross-section with the radially extending sides of each convolution axially flared in the direction of insertion of the rotatable member within the bore, such that upon insertion of the coil within the groove and upon initial insertion of the rotatable member within the bore and subsequent engagement of the rotatable member within the coil, the flare of the sides of each convolution acts to direct a portion of the axial force radially outward to further diametrically expand the coil into the annular groove, permitting insertion of the rotatable body into the coil.

* * * * *